United States Patent [19]

Desparois et al.

[11] Patent Number: 5,570,733
[45] Date of Patent: Nov. 5, 1996

[54] INFLATING TOOL FOR TIRES

[76] Inventors: Timothy R. Desparois; Michael R. Desparois, both of 1141 SW. Hensley Rd., Troutdale, Oreg. 97060

[21] Appl. No.: 336,834

[22] Filed: Nov. 9, 1994

[51] Int. Cl.$^6$ .................................................. B60C 25/12
[52] U.S. Cl. ........................................................ 157/1.1
[58] Field of Search ............................. 157/1, 1.1, 1.17

[56] References Cited

U.S. PATENT DOCUMENTS

| | | | |
|---|---|---|---|
| 3,552,469 | 1/1971 | Corless. | |
| 3,780,953 | 12/1973 | Malec | 239/526 |
| 3,814,163 | 6/1974 | Charles et al. | 157/1.1 |
| 3,866,654 | 2/1975 | Duquesne | 157/1.1 |
| 4,098,488 | 7/1978 | Forrest | 251/240 |
| 5,056,576 | 10/1991 | Iori | 157/1.1 X |
| 5,072,764 | 12/1991 | Ochoa. | |
| 5,247,982 | 9/1993 | Miller | 157/1.1 |

Primary Examiner—D. S. Meislin
Attorney, Agent, or Firm—Robert L. Harrington

[57] ABSTRACT

A tire bead seating tool for tubeless tires that initializes a sealing contact between the beads of a tire and the flanges of a wheel rim to enable inflating the tire through a valve stem of the wheel rim. The tool utilizes a valve controlled large volume, high pressure jet of air that is injected into the cavity of a deflated tire that has been mounted on a wheel rim. The jet of air is directed into the cavity through the space between the tire bead and the wheel rim flange. The large volume, high pressure jet of air will, due to the increased pressure generated within the cavity, force the sidewalls of the tire outward to move the beads of the tire into sealing contact with the wheel rim flanges.

5 Claims, 2 Drawing Sheets

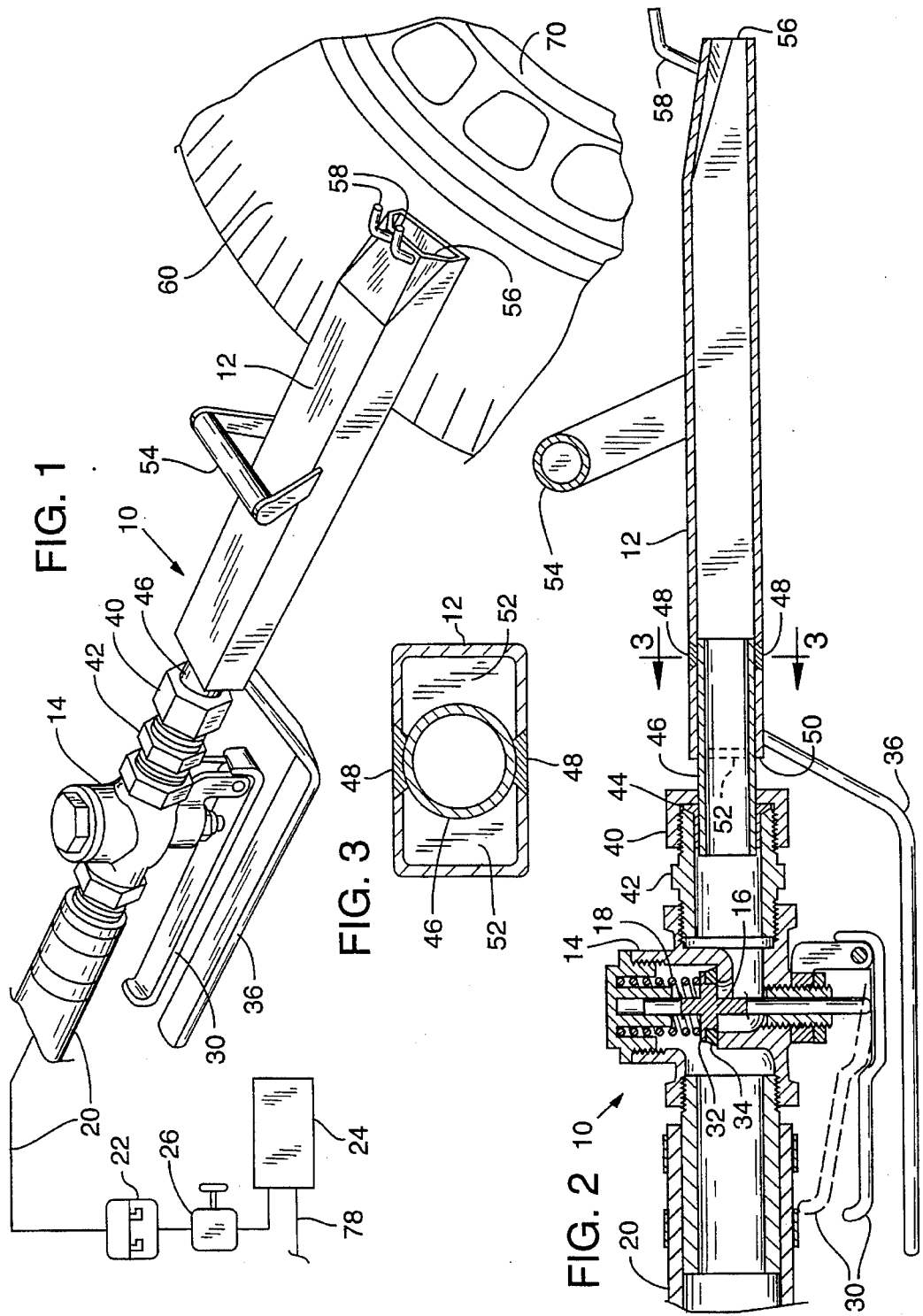

INFLATING TOOL FOR TIRES

FIELD OF THE INVENTION

This invention relates to a tool for mounting a tubeless tire to a wheel rim and more particularly for initiating a seal between the beads of the tire and the outer edges of the rim to enable conventional inflation with an air hose.

BACKGROUND OF THE INVENTION

A wheel consists of a wheel rim and a tire. With the tire inflated, the circular inner edge at each side of the tire, which is referred to as bead, is nested inside the rigid outer edges of the wheel rim which are referred to herein as the holding flanges or flanges of the rim. The tire beads and rim flanges are mated to form an air tight seal when the tire is inflated or partially inflated to expand the tire beads outwardly against the rigid flanges.

The problem addressed by the present tool concerns the mounting of tires to wheel rims, e.g., when repairing or replacing a tire and particularly large tires such as mounted on trucks, buses and the like. The tire is positioned or nested between the wheel rim edges and the wheel rim is most often laid on one of its sides. A valve stem provided on the wheel rim enables the installer to connect an air hose and inject air into the cavity formed by the tire and the rim. However, in the deflated condition, the tire bead at the top side of the tire falls away from the rim flange a slight amount creating an air space and air injected through the valve stem simply escapes through that air space. The installer has to figure some way to raise the bead up against the rim flange during the initial injection of air to establish a seal. With some minor amount of air pressure created inside the tire, the seal will be retained as the tire is inflated to the desired pressure.

This problem is particularly burdensome for installing tires on large wheels which can weigh several hundred pounds and are, therefore, difficult for an installer to handle. Two tools are known to be used for addressing this problem. The first is referred to as an air ring and is disclosed in U.S. Pat. No. 3,552,469, issued Jan. 5, 1971. A circular air conduit forming a ring is designed to encircle the wheel-rim just beyond the flange. The ring is connected to an air source and spaced air holes in the ring direct air into the space between the bead and flange. The ring injects air throughout the circumference of the rim to partially inflate the tire and in combination with air also injected through the valve stem, the tire is inflated sufficiently to create the seal.

A second, more recent tool disclosed in U.S. Pat. No. 5,072,764, issued Dec. 17, 1991, includes a portable air tank with a nozzle directly connected to the air tank. The tank and nozzle are designed to inject a predetermined volume of air rapidly through the nozzle. The nozzle outlet end is configured to direct air flow from the nozzle between the bead and rim flange. Whereas the greater portion of the surrounding space between the deflated tire and rim is still exposed through which air can escape, the instantaneous blast of air into the tire exceeds the rate of air escape, the tire is partially inflated and the seal is achieved.

A problem with the air ring is that it requires operation of both the conventional air line and air ring to initiate the seal and different types of rings are required for different sizes of tires.

A problem with the portable tank is that the tank is awkward to handle, a single tire can be inflated with the determined volume of air supply in the tank, and the release of such an air blast as necessary to achieve sealing can be dangerous. The tank requires rapid opening of a crank-type valve but holding onto the valve is important for controlling the direction of the air blast. Should the operator have any mishap such as his hand slipping off of the valve, the tool may unintentionally be whipped about by the air blast and cause injury or damage.

BRIEF DESCRIPTION OF THE PRESENT INVENTION

The preferred embodiment of the present invention incorporates an air nozzle with high volume air flow similar to what is employed by the portable tank. A large volume air line, e.g., of 1¼ inch diameter is connected to a source of air pressure, e.g., a compressor/tank combination that emits unlimited air pressure of 100 PSI to 150 PSI or the like. The nozzle is connected to the air line via a compatible air valve, e.g., capable of rapidly releasing the large flow of air transferred by the air line, into and through the nozzle. An important modification is the valve configuration. The valve includes a lever or trigger that opens the valve when manually depressed and is constantly urged to a closed position due to the air pressure in the line and a biasing spring. Thus, an installer depresses the trigger to release air through and into the nozzle and upon his release of the trigger, the air pressure in the line in combination with the spring operates to instantly close the valve. Preferably a guard surrounds the valve trigger to prevent inadvertent depression of the trigger, e.g., when dropped to the ground.

Unlike either of the prior tools, the present tool can be operated effectively and safely by a single installer for sequentially seating a plurality of deflated tires. The installer simply points the nozzle between the bead and rim flange, ejects a blast of air and releases the trigger to close the valve. He can lay the tool down and complete inflation using a conventional air line or he can go on to the second wheel and repeat the operation. The tool and its advantages will become more apparent upon reference to the detailed written description and drawings referred to therein.

BRIEF DESCRIPTION OF THE DRAWINGS

FIG. 1 is a view of a tire bead seater of the present invention for seating a bead of a tire against a flange of a wheel rim;

FIG. 2 is a sectional view of the tire bead seater of FIG. 1;

FIG. 3 is a sectional view as viewed on view lines 3—3 of FIG. 2; and,

DESCRIPTION OF THE PREFERRED EMBODIMENT

Figure 4:
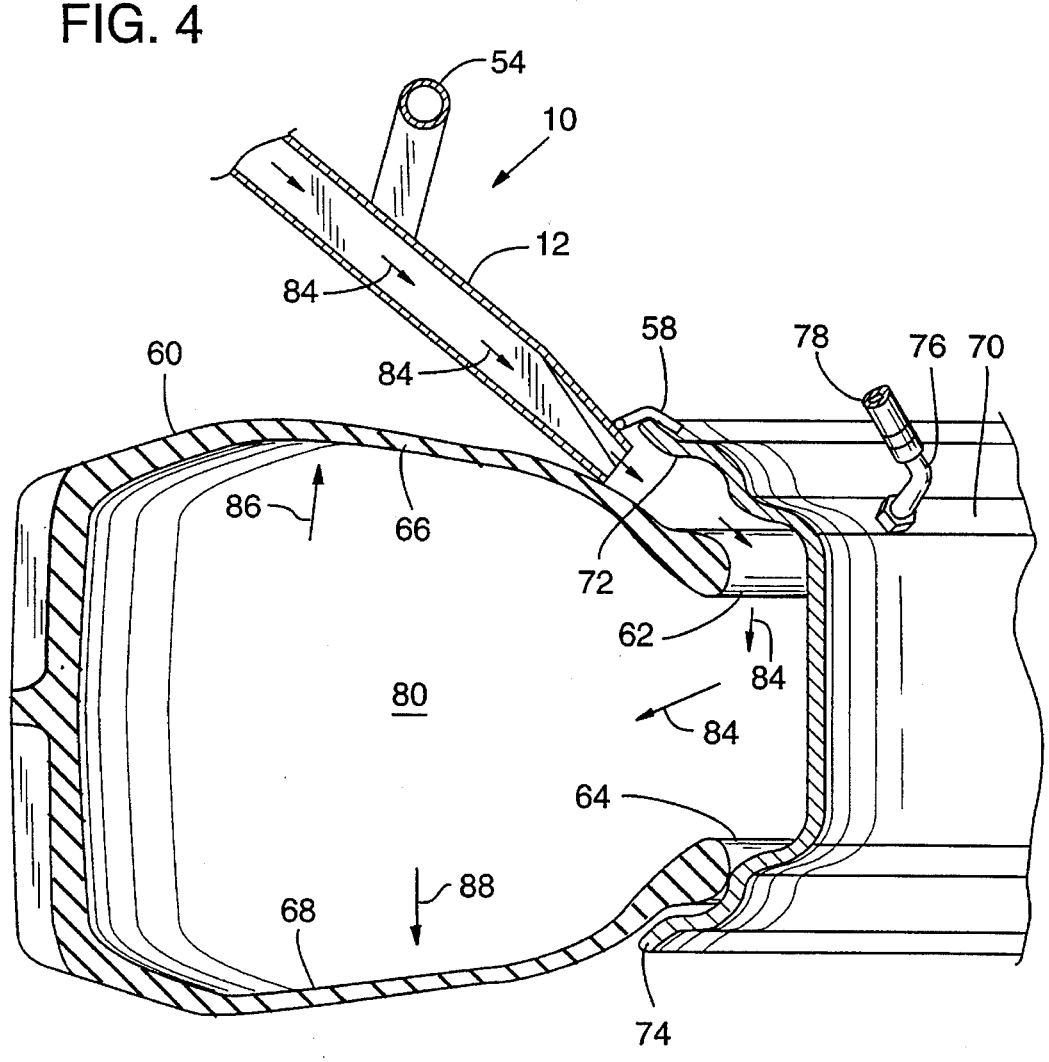
FIG. 4 is a view showing the tire bead seater positioned in relation to a wheel rim and tire to perform the operation of seating the bead of the tire against the rim flange.

Refer now to FIG. 1 of the drawings which illustrates a preferred embodiment of a tubeless tire bead seater 10 of the present invention. As will be later explained the seater 10 is utilized to initialize a seal between flanges of a wheel rim and the beads of a tire to facilitate inflating the tire through a conventional valve stem provided on the wheel rim. The bead seater 10 utilizes a high velocity, large volume directed air jet or stream to move the side walls of the tire outwardly to move the beads of the tire into engagement with the bead receiving flanges of the wheel rim.

The seater 10 as best seen in FIGS. 1 and 2 has a nozzle 12 for directing the stream of air into the cavity formed by a wheel rim 70 and a tire 60 mounted on the wheel rim. The nozzle 12 is connected to an outlet side of a control valve 14 which controls the flow of air through the nozzle 12. The valve 14 is normally closed with valve stem 16 biased to the closed position by a spring 18 (FIG. 2). One end of a large flexible air line 20 of a suitable length is threadably connected to an inlet side of the valve 14. The opposite end of the air line 20 is connected to an air source such as a compressor and tank assembly 24 by a quick disconnect coupling 22. A conventional shut off valve 26 is provided on the tank of the compressor and tank assembly 24 to control air flow to the air line 20 connected to the quick disconnect coupling 22. The air line 20 preferably has an internal diameter on the order of 1¼ inch to insure a high volume, high velocity of air flow.

The valve 14 is opened by operation of a hand lever 30. The hand lever 30 is pivotally mounted to the body of the valve 14 and is arranged to move the valve stem 16 against the biasing spring 18 to move the body 32 of the stem 16 away from the seat 34 of the valve 14 to thus open a passage for the flow of air from the line 20 through the valve 14 to the nozzle 12. As previously mentioned the valve stem 16 is biased to the closed position by the spring 18. The stem 16 is additionally biased to the closed position, when the line 20 is charged with compressed air, by the compressed air acting on the body 32 of the stem 16. This insures a rapid closing of the valve 14 when the hand lever 30 is released. A guard 36 is provided on the valve 14 to protect the lever 30 and also to prevent unintentional movement of the lever 30 when the seater 10 is out of the hands of an operator such as when the seater is placed on a supporting surface such as a bench or the ground.

The nozzle 12 is fitted to the valve 14 as shown in FIGS. 1 and 2. The nozzle 12 is secured to the valve 14 by a nut 40 threadably installed on a bushing 42 fitted to the body of the valve 14. A sleeve 44 fixedly secured to a pipe 46 of the nozzle 12 engages the nut 40 and the bushing 42 to secure the nozzle 12 in a fixed position. The pipe 46 is secured to the nozzle 12 as by welding as indicated by 48. The space between the pipe 46 and the end 50 of the nozzle 12 is closed by a filler plate 52 (FIG. 3) fitted to the nozzle 12 and the pipe 46 as by welding. A handle 54 is fitted to the nozzle 12 as by welding. The nozzle 12 in this embodiment is rectangular and as shown the end 56 of the nozzle 12 is tapered slightly to facilitate directing the air stream into the cavity between the tire 60 and rim 70. Extending clips (posts) 58 are provided on the end 56 of the nozzle 12 that are engageable with the flanges 72, 74 of the rim 70.

FIG. 4 illustrates a deflated tire 60 mounted on a rim 70. The tire seater 10 of the present invention is utilized to initialize a seal between the beads 62, 64 of a tire 60 and the flanges 72, 74 of a rim 70 so that the tire 60 may be inflated to a desired pressure by connecting the valve stem 76 provided on the rim 70 to a compressed air source, such as the compressor and tank assembly 24, by an air line 78.

The tire 60, when it is initially mounted to the rim 70 does not have its beads 62, 64 in contact with the flanges 72, 74 of the rim 70. Typically, the tire 60 is mounted to the rim 70 by a known tire mounting machine (not shown). The tire 60 and the rim 70 are preferably in the horizontal position as shown in FIG. 4 and the tire installer will, with the assistance of gravity, force the tire 60 downward to place the lower bead 64 in contact with the rim flange 74. The bead 62 of the tire 60 will be spaced apart from the rim flange 72 which creates a large space for air to escape from the internal cavity 80 defined by the tire 60 and the rim 70. The tire 60, since the bead 62 is spaced apart from the flange 72, is not inflatable in this condition by injecting air through the valve stem 76. The air injected through the valve stem 76 will simply escape through the space between the bead 62 and the flange 72 as rapidly as it enters the cavity 80. The bead seater 10 is utilized to initialize the seating and sealing of the beads 62, 64 of the tire 60 against the flanges 72, 74 of the rim 70. An operator (tire installer) places the seater 10 in position on the rim 70 with the clips (posts) 58 in engagement with the flange 72 of the rim 70. The installer will grip the handle 54 with one hand and grip the line 20 adjacent the valve 14 with the other hand with the other hand encircling the valve lever 30. The installer will forcibly hold the seater 10 against the flange 72 of the rim 70. The installer will then squeeze or depress the lever 30 to open the valve 14 which will force a large volume of air at a high velocity through the nozzle 12 into the cavity 80 as indicated by the directional arrows 84. The clips (posts) 58 enable the operator to forcibly hold the seater 10 against the rim 70. It will be appreciated that when the valve 14 is opened to discharge a large volume, high velocity jet of air, a propelling force will be generated which will forcibly urge the seater 10 away from the rim 70. The operator, by forcibly holding the seater 10 against the rim 70, will maintain the seater in the desired position. The clips (posts) 58 also permit the altering of the angle at which the nozzle 12 of the seater 10 is directed by simply pivoting the seater 10 on the rim 70. The large volume of air entering the cavity 80 at a high velocity will force the sidewalls 66, 68 of the tire 60 outwardly (as indicated by the directional arrows 86, 88) which will move the bead 62 of the tire 60 into contact with the flange 72 and will further seat the bead 64 against the flange 74. The large volume, high velocity stream of air entering the cavity 80 provides an increase of pressure within the cavity 80 to force the outward movement of the sidewalls 66, 68 of the tire 60. The bead 62 being moved against the flange 72 and the further seating of the bead 64 against flange 74 will provide a seal between the beads 62, 64 of the tire 60 with the flanges 72, 74 of the rim 70. The rapid jet or stream of air entering the cavity 80 to initialize the seating and sealing of the beads 62, 64 against the flanges 2, 74 will in effect partially inflate the tire 60. The tire is fully inflated by introducing pressurized air through the valve stem 76 connected to the air line 78. The air line is coupled to an air source, such as the compressor and tank assembly 24 (FIG. 1). The installer will release the lever 30 of the valve 14 as soon as the beads 62, 64 make an initial contact and seal with the flanges 72 of the rim 70.

The operating arrangement of the valve 14 of the seater 10 permits the operator to finely control the duration of the high volume, high velocity air stream emitted from the nozzle 12. The release of the lever 30 will instantly close the valve 14. The operator thus may control the amount of air used to initialize the seating and sealing of the beads 62, 64 of the tire 60 with flanges 72, 74 of the rim 70. If an initial jet of air is not sufficient, the operator will simply open the valve 14 to provide another jet of air.

The preferred embodiment illustrated the tire 60 and the rim 70 in the horizontal position. The seater 10 is also suited for use on a tire 60 and rim 70 that are in other positions, such as in a vertical orientation. The portability and ease of handling the seater 10 permits placement of the nozzle 12 in position on the rim 70 regardless of orientation of the tire 60 and the rim 70.

In addition to the above apparent structural differences as compared to the cited prior art discussed in the background section, there are important operational differences. The air ring initiator of the '469 patent creates an air curtain surrounding the air gap that inhibits air escape. The air ring requires the conventional air input through the valve to initiate seating because the air flow through the air ring is inadequate to achieve seating on its own. (The ring size of course has to match the tire rim size.)

The air tank-nozzle initiator of the '764 patent depends on the instantaneous release of a limited quantity of air. The initial blast of air has to overpower the air leakage to the extent that the seal is instantly achieved. (A significant leakage will exhaust the air source before seating is achieved.)

The tool of the present invention needs only to provide sufficient air input to overpower the air leakage but this can be marginal as the air source is unlimited. The difference in the time for achieving seating as compared to the tank type initiator is likely slower but only by a second or two at most and perhaps more like a fraction of a second. The time difference is insignificant as compared to the trade off of reliability and safety and, of course, this only relates to a single tire fill as the present tool allows the operator to rapidly sequentially fill multiple tires whereas the tank type needs to be refilled before each tire seating.

Those skilled in the art will recognize that modifications and variations may be made without departing from the true spirit and scope of the invention. The invention is therefore not to be limited to the embodiments described and illustrated, but is to be determined from the appended claims.

We claim:

1. A tire inflating tool for initiating the seal of a wheel-rim flange and a tire bead to enable conventional inflation through a valve stem comprising:

an air source;

a flexible elongated air line connected at one end to the air source;

a control valve connected to the other end of the air line by a connecting portion, and a nozzle rigidly connected to the control valve, said control valve having a normally closed position in reaction to the air pressure in the line and being manually opened to release the air pressure of the line into and through the nozzle;

said air source, air line, nozzle and control valve when open, cooperatively providing a large rate of air flow through the nozzle and through a portion of the space between a deflated tire's bead and wheel-rim flange that exceeds the rate of air that can escape between the flange and bead and thereby partially inflates the tire to form a seal between the wheel-rim flange and tire bead;

said nozzle, control valve and said connecting portion providing an elongated rigid seater member extending from an open end of the nozzle at the front end of the rigid seater member to the connecting portion at the rear end of the rigid seater member; and a post member provided on the open end of the nozzle for engaging a wheel-rim flange of a tire to be inflated, an actuating lever on the control valve adjacent said connecting portion, said connecting portion and said lever cooperatively arranged for gripping thereof with one hand of an installer for supporting the rear end of the rigid seater member and for selectively opening said control valve, said rear end and front end in longitudinal spaced apart alignment, a handle provided on said rigid seater member intermediate the front end and rear end for gripping by the operator' other hand, said post for engaging the wheel-rim flange, the connecting portion and handle substantially in alignment and thereby enabling the installer to apply a leveraged force for urging the post into engagement with the wheel-rim flange and resist recoil caused by opening of the control valve.

2. A tire inflating tool as defined in claim 1, further including:

a handle mounted on the nozzle for gripping by said another hand of the operator.

3. A tire inflating tool as defined in claim 2, further including:

a biasing member mounted in the valve for assiting in urging the valve to a closed position.

4. A tire inflating tool as defined in claim 1, further including:

a guard member surrounding said lever for avoiding inadvertent depression thereof.

5. A tire inflating tool as defined in claim 1 wherein the rate of air flow provided through said nozzle is marginally greater than the air escape rate.

\* \* \* \* \*